United States Patent [19]

Fuji

[11] Patent Number: 5,329,408
[45] Date of Patent: Jul. 12, 1994

[54] MAGNETIC FIELD MODULATION MAGNET-OPTICAL RECORDING APPARATUS IN WHICH AN FM MODULATOR AND A MAGNETIC HEAD DRIVING CIRCUIT ARE USED IN COMMON

[75] Inventor: Hiroshi Fuji, Nara, Japan

[73] Assignee: Sharp Kabushiki Kaisha, Osaka, Japan

[21] Appl. No.: 910,758

[22] Filed: Jul. 8, 1992

[30] Foreign Application Priority Data

Jul. 10, 1991 [JP] Japan ................................. 3-169894
Feb. 28, 1992 [JP] Japan ................................. 4-043639

[51] Int. Cl.$^5$ ............................................. G11B 5/02
[52] U.S. Cl. .................................... 360/59; 360/46;
360/114; 360/29; 360/30; 360/61; 369/59;
369/124
[58] Field of Search ............... 369/59, 124; 360/29,
360/30, 59, 61, 46, 114

[56] References Cited

U.S. PATENT DOCUMENTS 5,172,364 12/1992 Yoshimoto et al. ............ 360/114 X

FOREIGN PATENT DOCUMENTS 0321027 6/1989 European Pat. Off. .
0427325 5/1991 European Pat. Off. .
0429343 5/1991 European Pat. Off. .
56-44285 4/1981 Japan .
63-94406 4/1988 Japan .
63-244402 10/1988 Japan .
64-55762 3/1989 Japan .
3-12006 1/1991 Japan .

Primary Examiner—Robert J. Pascal
Assistant Examiner—Haissa Philogene
Attorney, Agent, or Firm—David G. Conlin; George W. Neuner

[57] ABSTRACT

A positive direction current source is connected to a magnetic head coil via a multiplier and a switching device, and a negative direction current source is connected to the magnetic head coil via the switching device. The output current of the positive direction current source is controlled to a level appropriate for generating a magnetic field forming a magnet-optical recording mark based on the amplitude of an information signal by the multiplier. The switching device is turned on/off by a carrier signal. As a result, a magnetic head driving signal can be obtained having the positive direction current value modulated based on the amplitude of the information signal.

14 Claims, 11 Drawing Sheets

FIG. 6
(a)
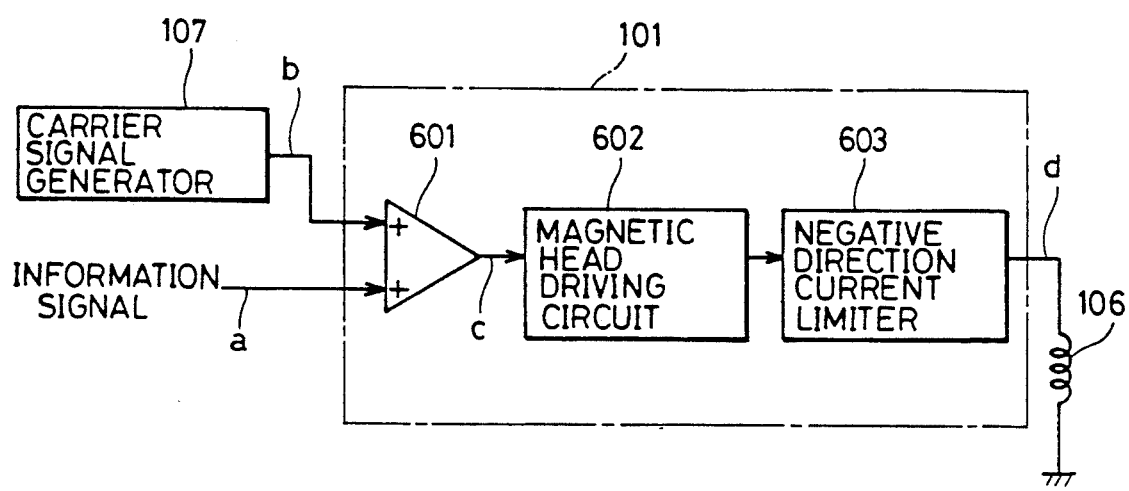
(b)
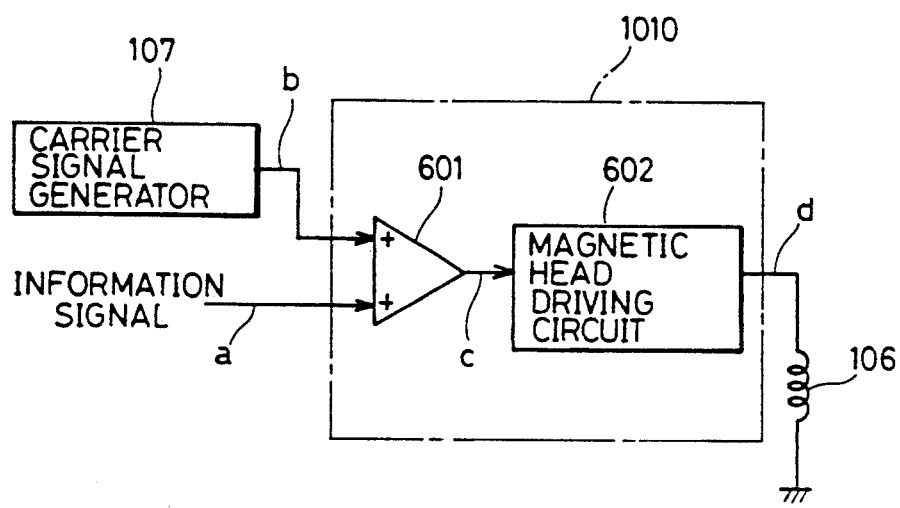

MAGNETIC FIELD MODULATION MAGNET-OPTICAL RECORDING APPARATUS IN WHICH AN FM MODULATOR AND A MAGNETIC HEAD DRIVING CIRCUIT ARE USED IN COMMON

CROSS-REFERENCE TO RELATED, COPENDING APPLICATION

Related, copending application of particular interest to the instant application is U.S. Ser. No. 07/901,025, entitled "Magnetic Head Driving Circuit", filed Jun. 19, 1992 and assigned to the same assignee of the instant application.

BACKGROUND OF THE INVENTION

1. Field of the Invention

The present invention relates to a recording apparatus, and more particularly, to a magnetic field modulation magnet-optical recording apparatus recording information digitally by modulating a magnetic field to be applied to a magnet-optical recording medium according to the information to be recorded utilizing thermomagnetic effect.

2. Description of the Background Art

FIG. 13 shows the structure of a recording system of a conventional magnet-optical recording apparatus.

Referring to FIG. 13, light provided from a laser light source 5 by a laser driving circuit 7 is modulated to locally irradiate via a condenser lens 9 a magnetic thin film 13 formed on the surface of a magnet-optical recording medium 1 such as a magnet-optical disc driven rotatably by a motor 3. The portion of the recording medium on which light is directed has the magnet holding force reduced due to the thermal energy caused by the irradiation. By establishing a flow of a predetermined current to a magnetic head coil 106 under this condition, a weak external magnetic field is applied to reverse magnetization only in the light irradiated region to carry out recording of the information.

The reading out method of the recorded information (residual magnetization) takes advantage of the inversion of the plane of polarization of a reflecting light or a transmitting light with respect to the direction of magnetization when a linear polarized light is directed to a magnetic body.

Known technology relating to the present application is listed as follows.

(1) Japanese Patent Laying-Open No. 56-44285

An optical recording/reproduction device is disclosed that modulates the intensity of a laser light by an FM video signal and a FM audio signal to carry out FM recording.

(2) Japanese Patent Laying-Open No. 3-12006

A method of generating a high-frequency field of a high level in a magnetic head coil is disclosed in a magnet-optical recording method by a magnetic field modulation system.

(3) Japanese Patent Laying-Open No. 64-55762

A bias magnetic field generating apparatus is disclosed for changing the driving current of a magnetic head coil. A magnetic field of a constant intensity can be applied to the recording medium even when the distance between the magnetic head coil and the recording medium changes by virtue of the amplitude of the driving current of the magnetic head coil being controlled by a focus error signal.

(4) Japanese Patent Laying-Open No. 63-244402

In a magnet-optical recording apparatus of a magnetic modulating system, a magnetic head driving circuit is disclosed that has a sudden rising and falling edge of a driving current of the magnetic head coil.

In principle, it is possible to FM record an information signal on a magnet-optical recording medium in a magnet-optical recording apparatus of a magnetic field modulation system by combining the known art of the above listed (1) and (2). More specifically, the magnetic head driving current which is FM modulated by the output signal of the FM modulator used in the apparatus of (1) can be applied to the magnetic head coil disclosed in (2).

However the above combination of the prior arts of (1) and (2) requires an FM modulator and also a driving circuit for conducting the driving current flow to the magnetic head coil, resulting in a problem that simplification and miniaturization of the configuration of a magnet-optical recording apparatus is prevented. It is to be noted that the method of (2) has a direct current magnetic field applied overlying the modulation magnetic field. The object thereof is to stabilize magnetization in the not-yet recorded portion, and has no meaning in carrying out FM recording.

The bias magnetic field generating apparatus of the above (3) for maintaining at a constant level the intensity of the direct current bias magnetic field applied to a recording medium is used in a magnet-optical recording apparatus of a photomodulation system. There is no disclosure of an arrangement for carrying out FM recording by a magnetic field modulation system in (3). There is also no disclosure of an arrangement for carrying out FM recording in (4).

SUMMARY OF THE INVENTION

An object of the present invention is to simplify the structure of a magnetic field modulation magnet-optical recording apparatus.

Another object of the present invention is to realize down-sizing of a magnetic field modulation magnet-optical recording apparatus.

In order to achieve the above objects, a magnetic field modulation magnet-optical recording apparatus of the present invention is a magnetic field modulation magnet-optical recording apparatus including a magnetic head device for applying to a magnet-optical recording medium a magnetic field modulated according to the information to be recorded, and which forms a magnet-optical recording mark having the magnetization direction specified in binary: including an AM modulator for AM modulating a first recording signal having a first frequency according to a second recording signal having a second frequency that is lower than the first frequency to provide an AM modulation signal, and a magnetic head driving circuit for converting the current value of the output AM modulation signal into a current value appropriate for generation of a magnetic field by the magnetic head and providing a magnetic head driving current of the converted current value to the magnetic head device, wherein the mark length of the magnet-optical recording mark is FM modulated based on at least the second recording signal.

The magnetic field modulation magnet-optical recording apparatus of the above structure does not require a separate circuit for FM modulating the first recording signal according to the second recording signal, and can have a configuration in which a conventional magnetic head driving circuit and an FM modulator are used in common. As a result, a magnetic field modulation magnet-optical recording apparatus that has its configuration simplified and down-sized, and that is capable of FM recording can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6(a,b) is a block diagram schematically showing a structure of a magnetic field modulation magnet-optical recording apparatus according to a third embodiment of the present invention.

DESCRIPTION OF THE PREFERRED EMBODIMENTS

The first embodiment of the present invention will be described hereinafter with reference to FIGS. 1-5.

Figure 13:
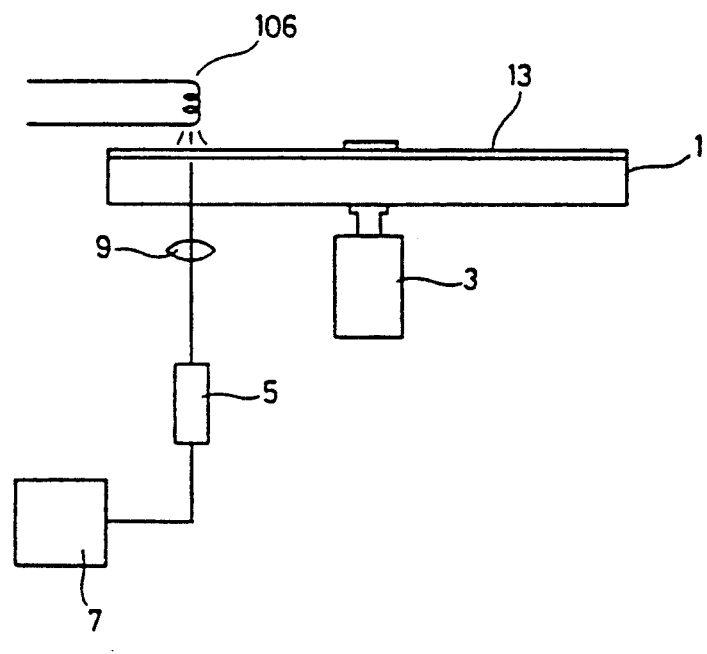
FIG. 13 is a diagram showing a structure of a recording system of a conventional magnet-optical recording apparatus.

A magnetic field modulation magnet-optical recording apparatus according to the first embodiment of the present invention generates and provides a magnetic head driving current d according to an information signal a to be recorded (a second recording signal) and a carrier signal b (a first recording signal) which are entered thereto. The direction of the magnetic head driving current d provided from a magnetic field FM modulation recording circuit 101 towards a magnetic head coil 106 is defined as the positive direction, and the opposite direction as the negative direction. The magnetic head coil 106 corresponds to that shown in FIG. 13, and has one terminal grounded.

The magnetic FM modulation recording circuit 101 includes a positive direction current source 102, a negative direction current source 104, a multiplier 103, and a switching device 105 in principle. The other terminal of the magnetic head coil 106 is connected to a terminal $T_1$ of the switching device 105. The switching device 105 has one of the two switching terminals, i.e. terminal $T_2$, connected to the output of the multiplier 103. The multipling input terminal of the multiplier 103 is connected to an information signal source not shown to have an information signal a input. The multiplied input terminal of the multiplier 103 is connected to the output of the positive direction current source 102. The other switching terminal $T_3$ of the two switching terminals of the switching device 105 is connected to the input side of the negative direction current source 104. The switching control terminal not shown of the switching device 105 is connected to the output of the carrier signal generator 107 to input a carrier signal b having a frequency higher than that of the information signal a.

The switching device 105 has terminals $T_2$ and $T_1$ conducting when the level of the carrier signal b provided to the switching control terminal is positive, for example, and the magnetic head coil 106 is connected to the side of the positive direction current source 102. When the level of the carrier signal b is negative, terminal $T_3$ and terminal $T_1$ will conduct, and the magnetic head coil 106 is connected to the side of the negative direction current source 104.

The multiplier 103 controls the level of the positive direction current provided from the positive direction current source 102 according to the level of the information signal a provided to the multiplying input terminal. As a result, when the level of the carrier signal b is positive, a positive direction magnetic head driving current d having its level controlled appropriately flows to the magnetic head coil 106. When the level of the carrier signal b is negative, a negative direction magnetic head driving current d having an appropriate constant level flows to the magnetic head coil 106. In other words, the amplitude of the magnetic head driving current d flowing in the negative direction is fixed to a constant value, and the amplitude of the magnetic head driving current d flowing in the positive direction is modulated according to the information signal a with respect to the magnetic head coil 106.

Because the generation of unnecessary current is limited by fixing the amplitude of the magnetic head driving current d flowing in the negative direction at a constant value, the consumption power of the apparatus can be reduced. This effect of reducing consumption power is great considering that the amplitude of the magnetic head driving current d is approximately 0.1–0.5 A, which is considerably a great value in comparison with the consumption current of an integrated circuit, and also from the standpoint of reducing the size of a computer.

The recording apparatus of the present invention requires a smaller number of components in comparison with that of the second embodiment described afterwards in which the amplitude of the magnetic head driving current d is not fixed to a constant value.

The magnetic field FM modulation recording circuit 101 of FIG. 1 will be described in detail with reference to FIG. 2.

As a circuit for conducting a flow of a positive direction magnetic head driving current d having its level controlled appropriately to magnetic head coil 106, the anode of a positive direction direct current power source 1020 having the cathode grounded is connected via a multiplier 103, an auxiliary coil 201, a magnetic head coil 106 to one terminal of a switching device 105b having the other terminal grounded.

As a circuit for conducting a flow of negative direction magnetic head driving current d fixed to an appropriate constant level to the magnetic head coil 106, the cathode of a negative direction direct current power source 1040 having the anode grounded is connected via the auxiliary coil 202 and the magnetic head coil 106 to one terminal of a switching device 105a having the other end grounded.

Figure 1:
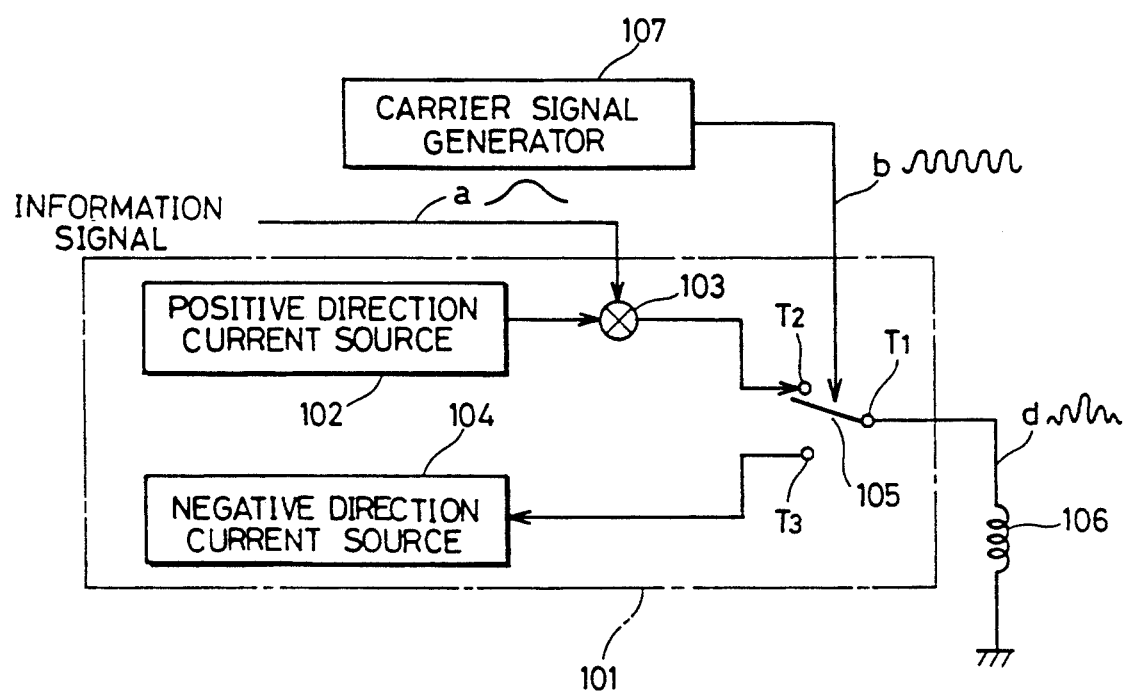
FIG. 1 is a block diagram schematically showing a structure of a magnetic field modulation magnet-optical recording apparatus according to a first embodiment of the present invention.
Figure 2:
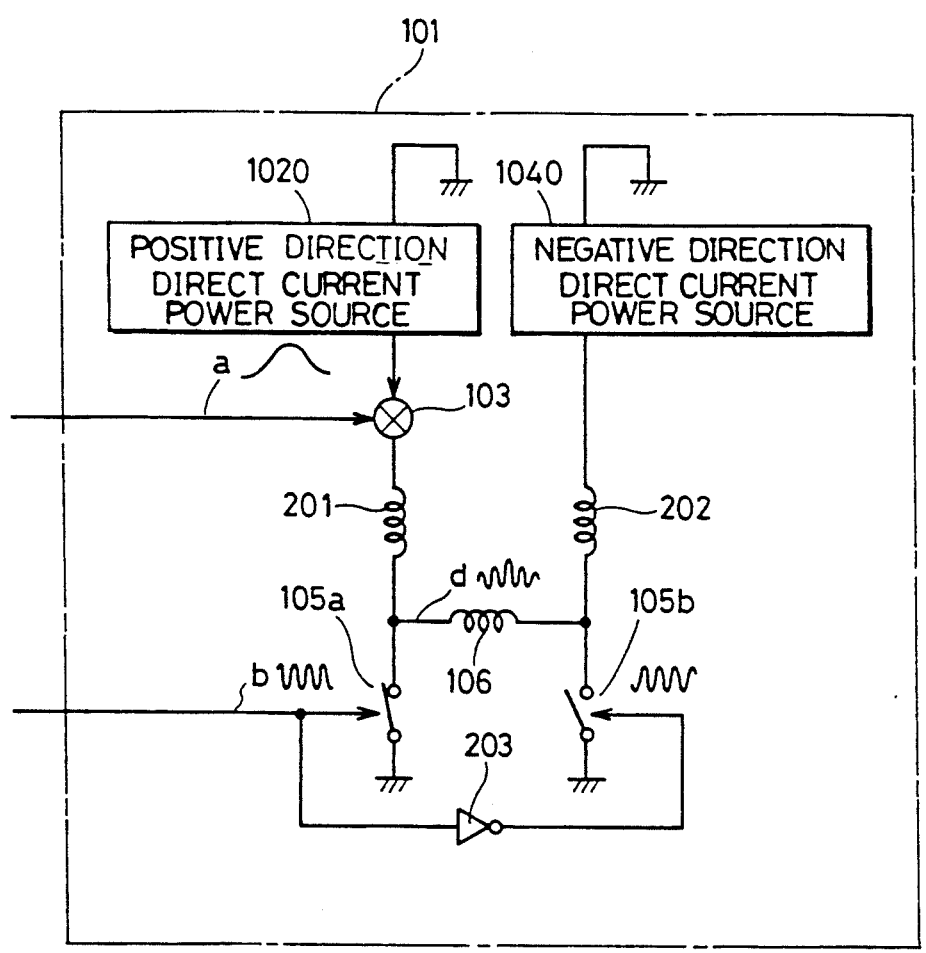
FIG. 2 is a circuit diagram specifically showing a structure of the magnetic FM modulation recording circuit of FIG. 1.
Figure 3:
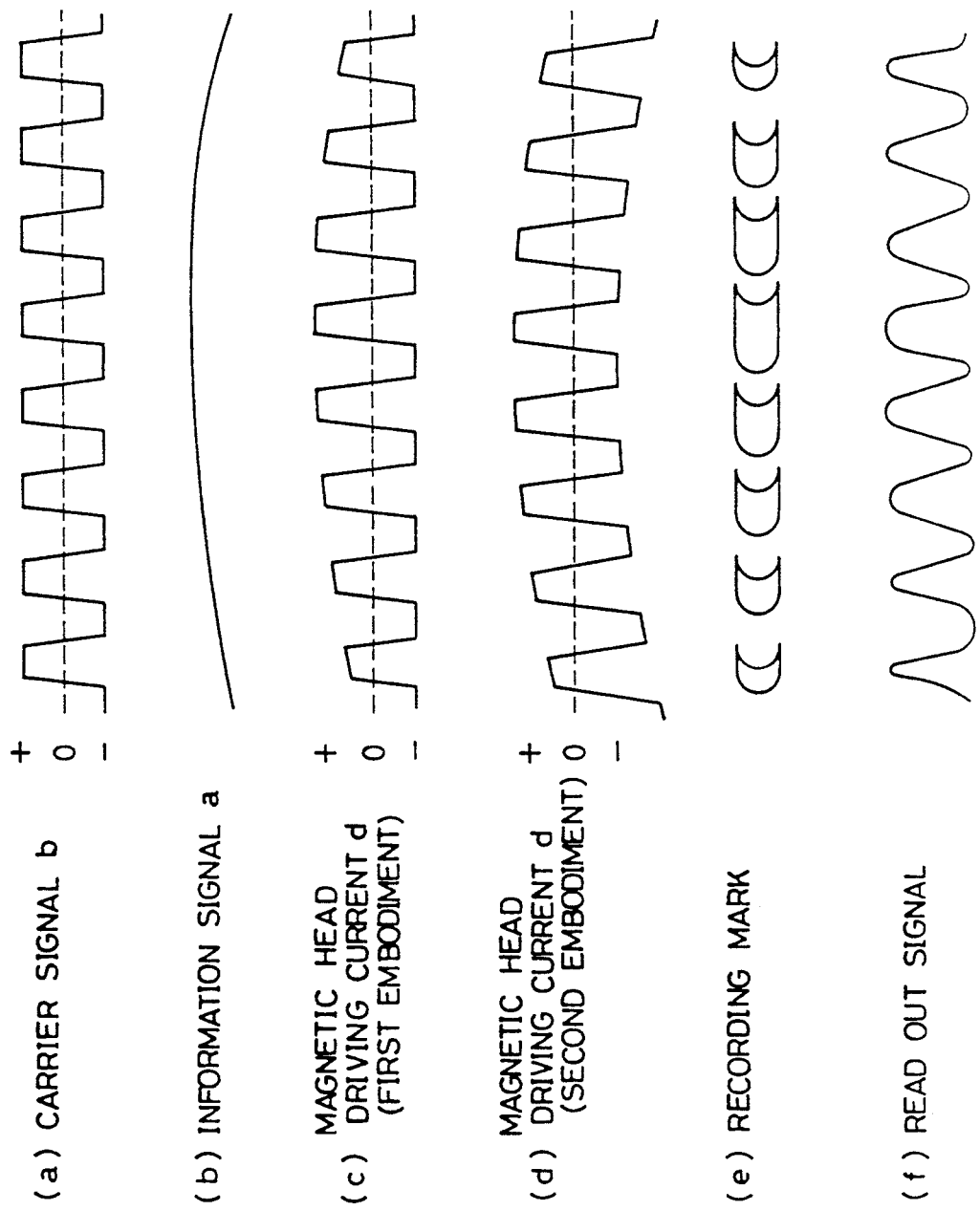
FIG. 3 (a-f) is a diagram showing signal waveforms from various components of the magnetic FM modulation recording circuit of FIG. 2, the format of a recording mark formed on the magnet-optical recording medium, and a waveform of the read out signal according to the recording mark.

The multiplying input terminal of the multiplier 103 is connected to an information signal source not shown, as in FIG. 1, to input an information signal a shown in FIG. 3(b) for example. To the switching device 105a, a carrier signal b shown in FIG. 3(a) for example is provided, and to the switching device 105b, a carrier signal b having its polarity inversed by an inverter 203 is provided. Switching devices 105a and 105b are implemented to close the circuit when the carrier signal b is at the positive level, and to open the circuit when the carrier signal b is at the negative level. Therefore, by the function of the inverter 203, the open/close operation of switching devices 105a and 105b will be carried out alternately by a half-period of the carrier signal b.

The multiplier 103 may be substituted by a current controller such as a bipolar transistor or a FET (Field Effect Transistor).

In the above structure, when the switching device 105b is closed and the switching device 105a is opened, the positive current of a predetermined level provided from the positive direction direct current power source 1020 has its level controlled according to the change in the information signal a by the multiplier 103. Therefore, as shown in FIG. 3(c), a positive direction magnetic head driving current d having the envelope corresponding to the waveform of the information signal a and having its level controlled appropriately flows to the magnetic head coil 106.

When the switching device 105a is closed and the switching device 105b is opened, a negative direction magnetic head driving current d fixed to an appropriate constant level flows from the magnetic head coil 106 to the negative direction direct current power source 1040, as shown in FIG. 3(c). Eventually, the direction of the magnetic head driving current d is switched in synchronization with the carrier signal b, as shown in FIGS. 3(a) and (c).

When magnet-optical recording is carried out on a vertical magnetic film on the magnet-optical recording medium according to the magnetic field generated by the magnetic head coil 106 by the above-described magnetic head driving current d, an information signal a is FM recorded by the mark length of a recording mark having its vertical magnetization direction specified in binary corresponding to the magnetic head driving current d, as shown in FIG. 3(e). In other words, when the recording mark shown in FIG. 3(e) is read out by an optical head, a read out signal that is FM modulated is obtained, as shown in FIG. 3(f).

The reason why an information signal a can be FM recorded without requiring a particular FM modulator will be described hereinafter.

Figure 4:
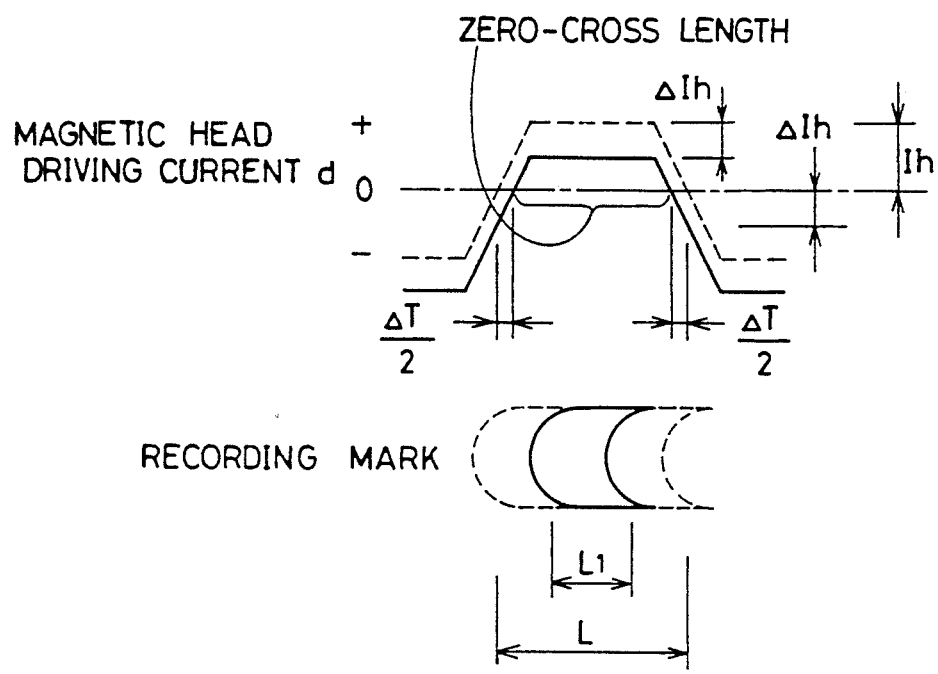
FIG. 4 is a diagram for showing the relationship between the level of a magnetic head driving current and the length of a recording mark formed according to the level of the magnetic head driving current, according to the first embodiment of the present invention.

FIG. 4 shows the correspondence between the level of the magnetic head driving current d and the length of a recording mark formed thereby. The broken line corresponds to the case where the amplitude of the information signal a is 0, and the solid line corresponds to the case where the amplitude of the information signal a is $-\Delta Ih$. In other words, the broken line corresponds to the case where the information signal a is at a standard level, and the solid line corresponds to the case where the information signal a is modulated in a negative direction with respect to the standard level. When the amplitude of the information signal a is 0, the amplitude of the magnetic head driving current d is $Ih$, and the length of the recording mark formed on the magnet-optical recording medium is L.

When the magnetic head driving current d is $-\Delta Ih$ modulated with respect to the amplitude $Ih$ as a result of the amplitude of the information signal a attaining $-\Delta Ih$, the length of the recording mark is reduced from L to $L_1$ because of the two reasons that will be described hereinafter. That is to say:

(1) Because the zero-cross point of the rising edge and the zero-cross point of the falling edge of the magnetic head driving current d approach each other respectively by $\Delta T/2$, the length of the zero-cross, i.e. the application time of a magnetic field becomes shorter by $\Delta T$.

(2) Corresponding to the decrease in the positive direction current value of the magnetic head driving current d by $\Delta Ih$, the intensity of the magnetic field generated by the magnetic head coil 106 decreases by $\Delta H$.

Figure 5:
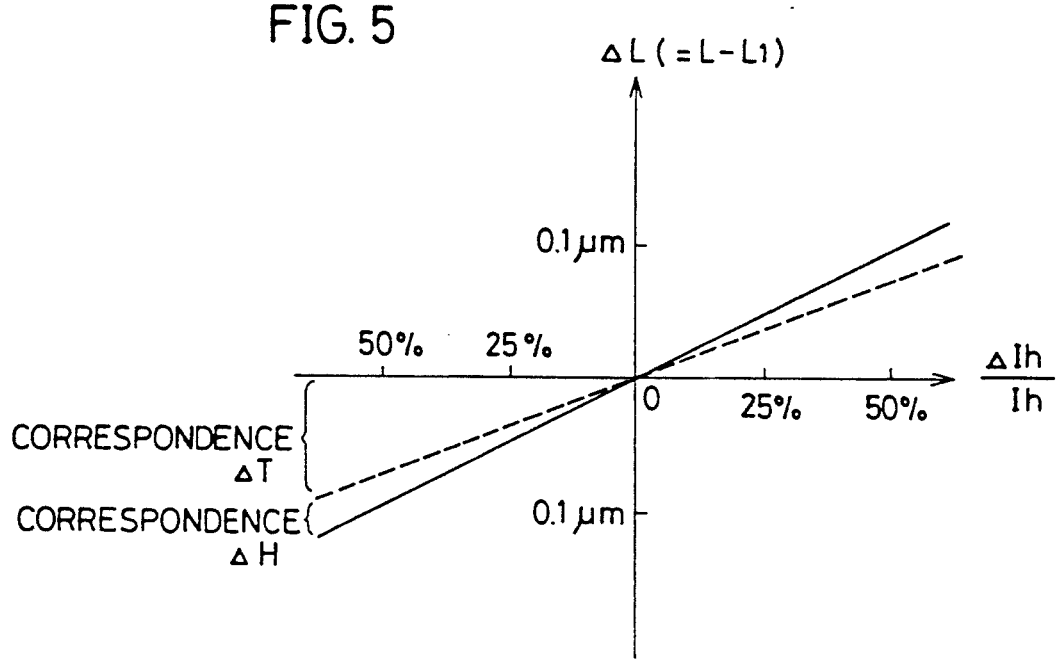
FIG. 5 is a graphic representation showing the result of measuring the relationship between a changing ratio $\Delta Ih/Ih$ of a positive direction current value in the magnetic head driving current and a changing amount $\Delta L$ of a mark length of a recording mark according to the first embodiment of the present invention.

In FIG. 5, the changing ratio $\Delta Ih/Ih$ of the positive direction current value of the magnetic head driving current d, and the changing amount $\Delta L$ ($=L-L_1$) of the mark length of the recording mark are measured and the results shown in the solid line. As the measuring conditions, Ih is set to 0.2 A, and the recording laser power set to 5 mW As described above, $\Delta L$ is divided into the change corresponding to the $\Delta T$ reduction of (1) and the change corresponding to the $\Delta H$ decrease of (2). The ratio of the change is shown in the broken line in FIG. 5.

It was appreciated that the changing amount $\Delta L$ of the mark length of the recording mark is proportional to the changing ratio of $\Delta Ih/Ih$ of the positive direction current value of the magnetic head driving current d. Therefore, it was understood that $\Delta L$ can be modulated by $\Delta Ih$. More specifically, the mark length of the recording mark can be modulated by changing the positive direction current value of the magnetic head driving current d. As described above, the negative direction current value is fixed to a constant level, and a recording mark that is FM modulated can be formed by the magnetic head driving current d shown in FIG. 3(c) in which the positive direction current value is modulated.

By succeeding research, it was found that a FM-modulated recording mark can be formed without necessarily fixing the negative direction current value of the magnetic head driving current d to a constant level. Only changing at least the positive direction current value of the magnetic head driving current d according to the amplitude of the information signal a is required.

It is needless to say that it will become difficult to carry out FM recording when the relationship between ΔL and ΔIh/Ih differs greatly from the linear relation shown in FIG. 5.

The present embodiment is not limited to the case where the information signal a is an analog signal, and digital FM modulation may be carried out using a digital signal.

A second embodiment of the present invention will be described hereinafter with reference to FIGS. 11 and 12. For the sake of simplicity, components corresponding to those shown in the figures relating to the above-described embodiments have the same reference characters denoted, and their description will not be repeated.

Figure 11:
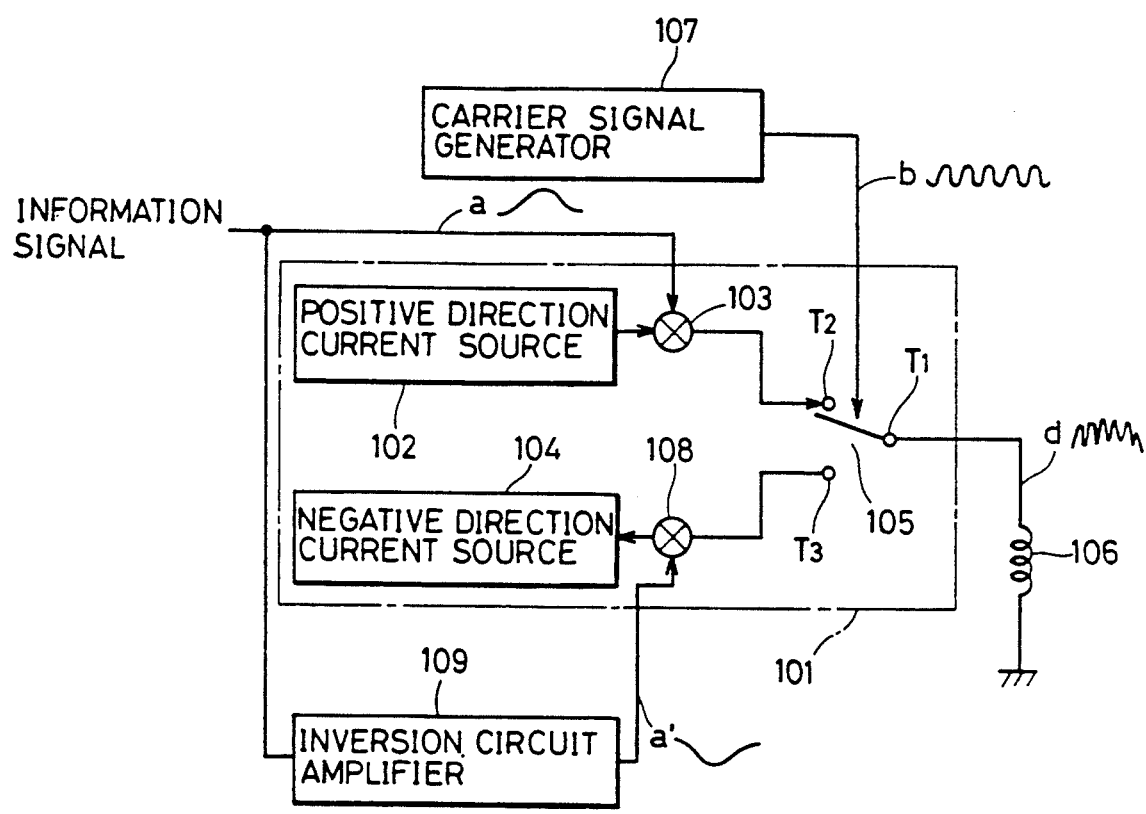
FIG. 11 is a block diagram schematically showing a structure of the magnetic field modulation magnet-optical recording apparatus according to the second embodiment of the present invention.
Figure 12:
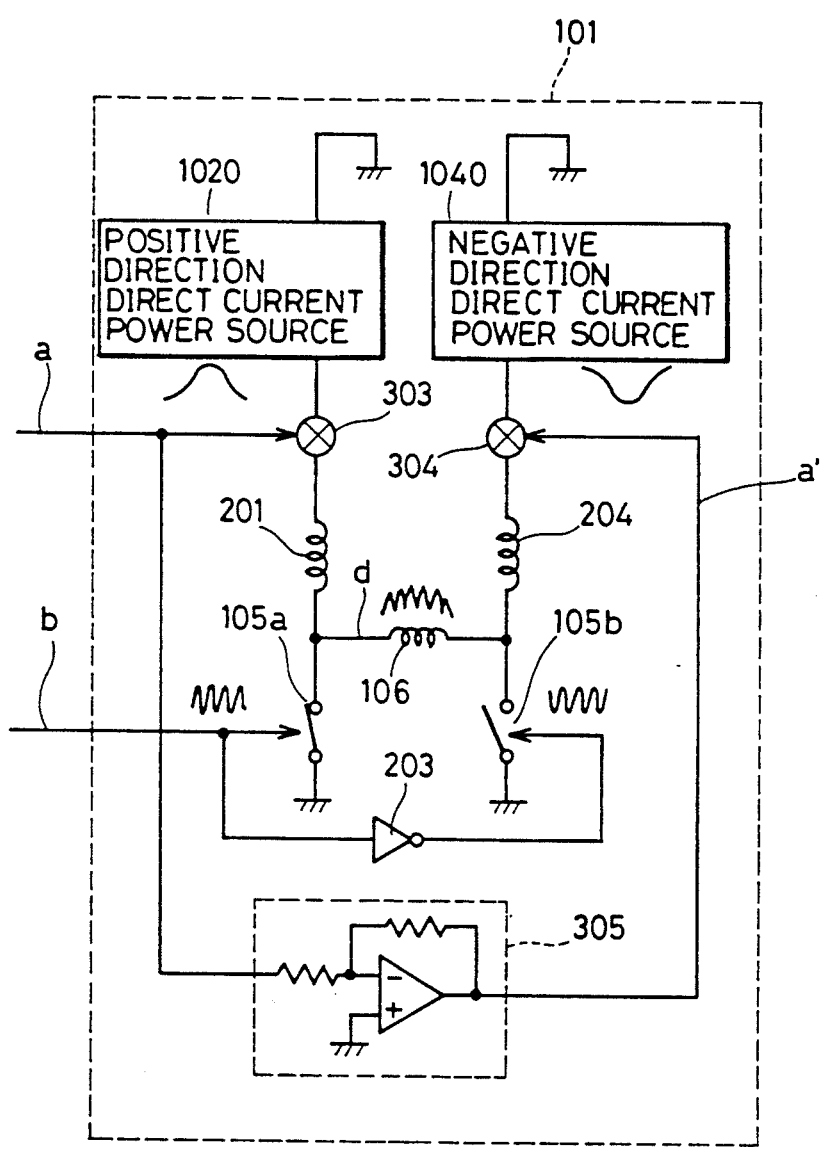
FIG. 12 is a circuit diagram specifically showing a structure of the magnetic FM modulation recording circuit of FIG. 11.

Referring to FIG. 11, the magnetic FM modulation recording circuit 101 according to the present embodiment for generating and providing a magnetic head driving current d according to an information signal a to be recorded and a carrier signal b is implemented with a multiplier 108 and an inversion circuit amplifier 109 in addition to the structure of the first embodiment of FIG. 1 in principle. The multiplier 108 has its multiplied input terminal connected to a terminal T3 and its output terminal connected to the input side of the negative direction current source 104. The multiplying input terminal of the multiplier 108 is connected to an information signal source not shown via the inversion circuit amplifier 109.

As described above, the multiplier 103 controls the level of the positive direction current provided from the positive direction current source 102 according to the level of the information signal a provided to the multiplying input terminal. Thus, when the level of the carrier signal b is positive, a positive direction magnetic head driving current d having its level controlled appropriately flows to the magnetic head coil 106.

The inversion circuit amplifier 109 provides to the multiplying input terminal of the multiplier 108 an inverted information signal a' which is the information signal a having the phase inverted. Accordingly, the multiplier 108 controls the level of the negative direction current applied to the negative direction current source 104 according to the level of the provided inverted information signal a'. As a result, a negative direction magnetic head driving current d having its level controlled appropriately flows to the magnetic head coil 106 when the level of the carrier signal b is positive.

The magnetic FM modulation recording circuit 101 of FIG. 11 will be described in detail with reference to FIG. 12.

As a circuit for conducting a flow of a positive direction magnetic head driving current d having its level controlled appropriately to the magnetic head coil 106, the anode of the positive direction direct current power source 1020 having the cathode grounded is connected via a multiplier 303, an auxiliary coil 201, and the magnetic head coil 106 to one terminal of the switching device 105b having the other terminal grounded.

As a circuit for conducting a flow of a negative direction magnetic head driving current d having its level controlled appropriately to the magnetic head coil 106, the cathode of the negative direction direct current power source 1040 having its anode grounded is connected via a multiplier 304, an auxiliary coil 204, and the magnetic head coil 106 to one terminal of the switching device 105a having the other terminal grounded.

The control terminal of the multiplier 303 is connected to an information signal source not shown to have an information signal a shown in, for example FIG. 3(b), entered. The control terminal of the multiplier 304 is connected to an information signal source not shown via the inversion amplifying circuit 305 to have an inverted information signal a' having a phase opposite to that of the information signal a entered.

The provision of the carrier signal b shown in FIG. 3(a) to the switching device 105a and to the switching device 105b via the inverter 203 is similar to that of the first embodiment. Therefore, the open/close operation of the switching devices 105a and 105b are carried out alternately in the unit of a half period of the carrier signal b by the function of the inverter 203.

Multipliers 303 and 304 may be substituted by a current controller such as a bipolar transistor or a FET.

According to the above-described structure, the positive direction current of a predetermined level provided from the positive direction direct current power source 1020 has its level controlled appropriately by the multiplier 303, so that a positive direction magnetic head driving current d flows to the magnetic head coil 106, as in the case of the first embodiment.

When the switching device 105a is closed and the switching device 105b is opened, the negative direction current of a predetermined level flowing towards the negative direction direct current power source 1040 from the magnetic head coil 106 has its level controlled according to the change in the inverted information signal a' by the multiplier 304. Thus, as shown in FIG. 3(d), a negative direction magnetic head driving current d having its level controlled appropriately and having the envelope corresponding to the waveform of the information signal a flows to the magnetic head coil 106.

Thus by switching the direction of the current by the carrier signal b while having the current value controlled to an appropriate level by the information signal a and the inverted information signal a', a magnetic head driving current d that allows the formation of an FM-modulated recording mark can be generated.

Figure 7:
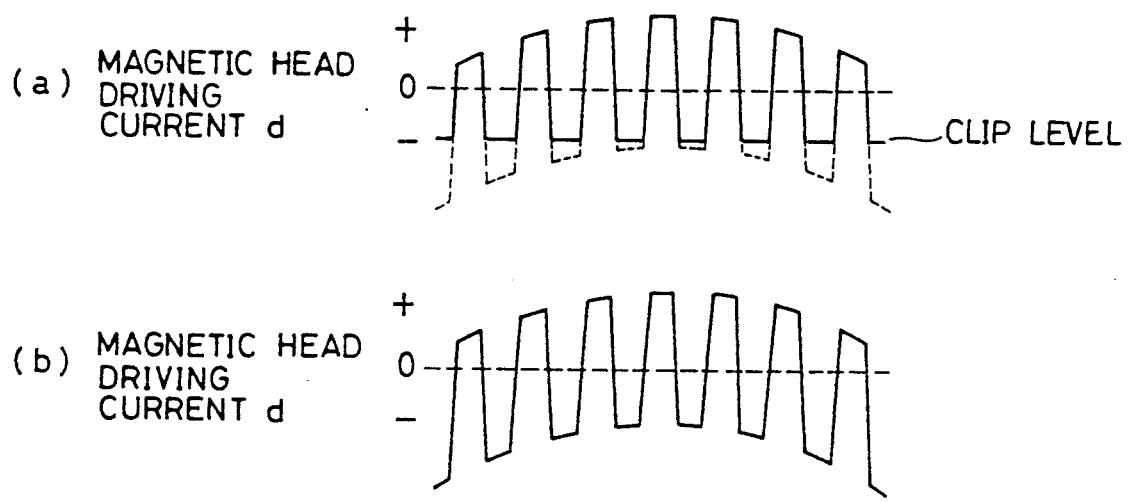
FIG. 7(a,b) is a waveform diagram showing a magnetic head driving current generated by the structure shown in FIG. 6.

A third embodiment of the present invention is described hereinafter with reference to FIGS. 6 and 7. For the sake of simplification, the components corresponding to those in the figures relating to the above-described embodiments have the same reference characters denoted, and there description will not be repeated.

Referring to FIG. 6(a), the magnetic FM modulation recording circuit 101 of the present embodiment has a structure in which an adding circuit 601, a magnetic head driving circuit 602, and a negative direction current limiter 603 are connected in series. The adding circuit 601 has one input terminal connected to an information signal source not shown supplied with the information signal a and the other input terminal connected to the carrier signal generator 107 supplied with the carrier signal b.

As the magnetic FM modulation recording circuit 1010 of FIG. 6(b), the negative direction current limiter 603 of FIG. 6(a) may be omitted.

According to the above structure, the information signal a and the carrier signal b are added in the adding circuit 601 as an added signal c to be provided to the magnetic head driving circuit 602. The magnetic head driving circuit 602 converts the output level of the adding circuit 601 to an appropriate level to provide a signal having the waveform shown in FIG. 7(b).

When the negative direction current limiter 603 is not provided as shown in FIG. 6(b), the above-described output of the magnetic head driving circuit 602 is directly provided to the magnetic head coil 106 as the magnetic head driving current d. If the negative direction current limiter 603 is provided as shown in FIG. 6(a), the negative direction current value provided from the magnetic head driving circuit 602 is clipped at a predetermined negative limit level by the negative direction current limiter 603 as shown in FIG. 7(a), to be provided to the magnetic head coil 106 as the magnetic head driving current d.

The waveform of the magnetic head driving current d shown in a solid line in FIG. 7(a) is similar to the waveform of FIG. 3(c). The waveform of the magnetic head driving current d shown in the solid line of FIG. 7(b) is similar to the waveform of FIG. 3(d). As a result, according to the magnetic head driving current d, FM recording can be carried out, as in the above-described embodiments.

Although the structures of the magnetic FM modulation recording circuits differ in comparing the present embodiment to the first and second embodiments, the operation modulating the amplitude of at least the positive direction current value in the magnetic head driving current d having its level controlled appropriately is identical. Therefore, the structures of the magnetic FM modulation recording circuits 101 and 1010 shown in FIGS. 6(a) and (b) are only some examples of the present invention, and any structure of a circuit that carries out the above-described operation may be used.

Figure 8:
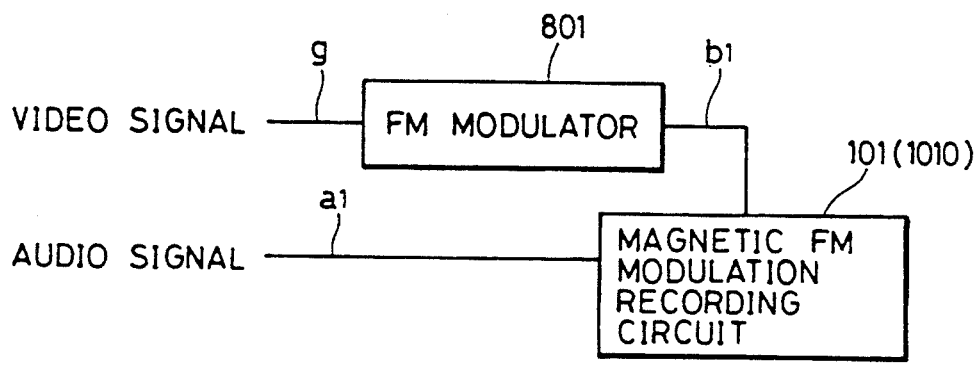
FIG. 8 is a block diagram showing a structure of a fourth embodiment of the present invention.

A fourth embodiment of the present invention will be described hereinafter with reference to FIG. 8.

In the fourth embodiment, the carrier signal generator 107 of FIG. 1 is substituted by an FM modulator 801 for FM modulating a video signal g. More specifically, the first recording signal is the FM video signal $b_1$ provided from the FM modulator 801, and the second recording signal having a frequency lower than that of the first recording signal is the audio signal $a_1$.

As the structure of the magnetic FM modulation recording circuit, the structure of the magnetic FM modulation recording circuit 101 or 1010 shown in the above embodiments can be employed.

According to the above-described structure, the positive direction current value of the FM video signal $b_1$ is controlled according to the amplitude of the audio signal $a_1$, and the negative direction current value is fixed to a predetermined level. Although the frequency of the carrier signal b was constant, i.e. each zero-cross length of the magnetic head driving current d was constant in the first and second embodiments, the present embodiment has the zero-cross length of the magnetic head driving current d FM modulated according to the amplitude of the video signal g because the FM video signal $b_1$ is FM modulated according to the amplitude of the video signal g by the FM modulator 801.

Therefore, the mark length of the recording mark has the modulation of the zero-cross length of the magnetic head driving current d induced by the FM video signal $b_1$ overlaid with the modulation of the original zero-cross length induced by the audio signal $a_1$. This means that the video signal g and the audio signal $a_1$ are FM recorded in separate band regions by the mark length of the recording mark. By passing the read out signal of the recording mark through a predetermined band pass filter, the video signal g and the audio signal $a_1$ can be detected separately.

Figure 9:
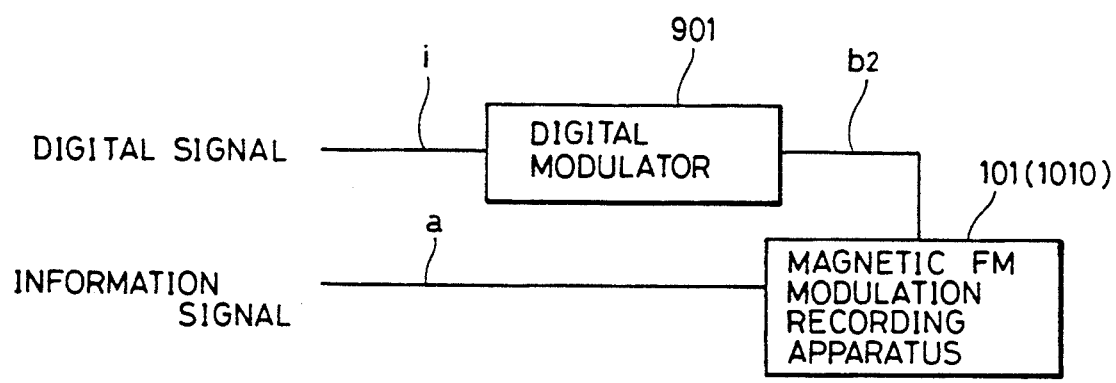
FIG. 9 is a block diagram showing a structure of a fifth embodiment of the present invention.

A fifth embodiment of the present invention will be described hereinafter with reference to FIGS. 9 and 10.

In the fifth embodiment, the carrier signal generator 107 of FIG. 1 is substituted by a digital modulator 901 for modulating a digital signal i according to a predetermined rule. More specifically, the first recording signal is a digital modulation signal $b_2$ provided from the digital modulator 901, and the second recording signal having a frequency lower than that of the first recording signal is an analog information signal a.

As the structure of the magnetic FM modulation recording circuit, the magnetic FM modulation recording circuit 101 or 1010 shown in the above-described embodiments can be employed.

According to the above structure, the positive direction current value of the digital modulation signal $b_2$ provided from the digital modulator 901 is controlled according to the amplitude of the information signal a, and the negative direction current value is fixed to a predetermined level. As in the above-described third embodiment, the modulation of the zero-cross length of the magnetic head driving current d has the modulation of the zero-cross length induced by the digital modulation signal $b_2$ overlaid with the modulation of the original zero-cross length induced by the information signal a. Therefore, it is possible to simultaneously carry out digital modulation recording and analog FM modulation recording.

Figure 10:
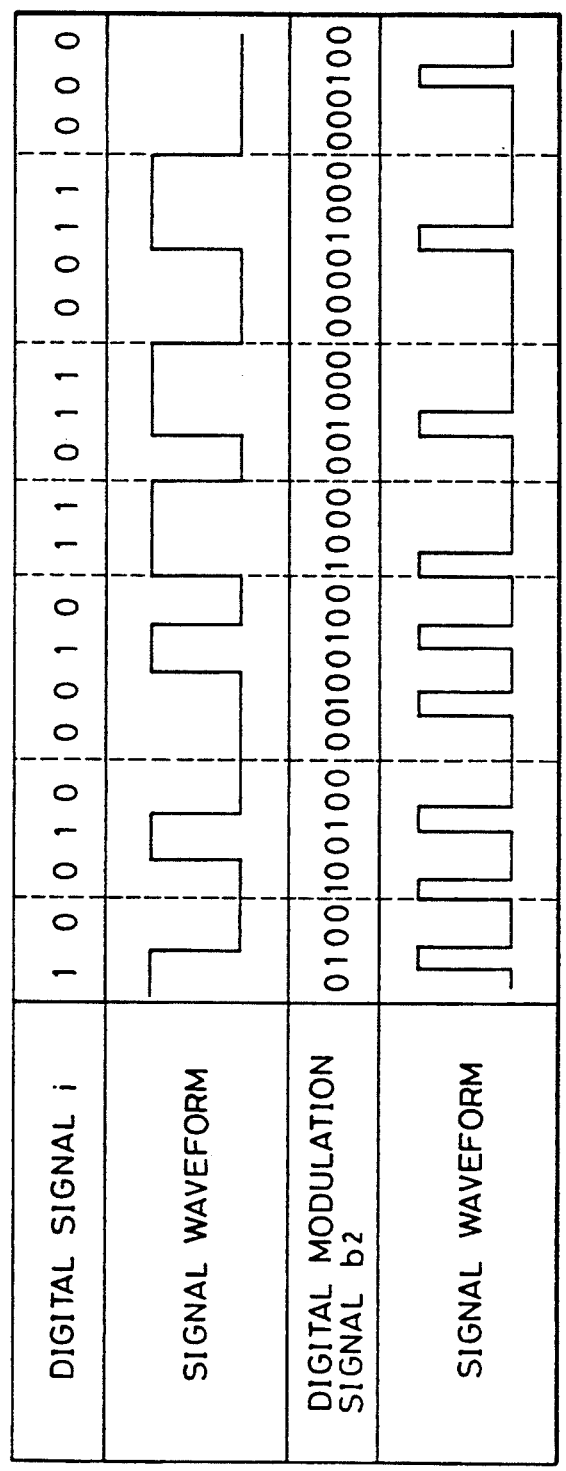
FIG. 10 is a diagram for describing the input/output data and the input/output signal waveform of the digital modulator of FIG. 9.

FIG. 10 shows the case where the digital modulator 901 provides a digital modulation signal $b_2$ that is 2-7 modulated (2-7RLL) according to an input digital signal i. Besides the 2-7 modulation method, there are well known the 8-10 modulation method wherein an 8 bit data symbol is converted into a 10-bit data, and the EFM modulation method wherein an 8 bit data symbol is converted into a 14 bit data to insert 3 bits of link data. The 8-10 modulation method is employed in a digital audio tape (DAT), and the EFM modulation method is employed in a compact disc (CD).

For example, a conventional CD and a video disc may be commonly used with one magnet-optical disc, by providing an EFM-modulated digital modulation signal $b_2$ and an analog video signal to the magnetic FM modulation recording circuit 101.

The present invention is not limited to the above described first-fifth embodiments in which at least the positive direction current value is modulated including the case where the negative current value is fixed to a constant value, and a similar effect can be obtained with a structure in which at least the negative direction current value is modulated including the case where the positive direction current value is fixed to a constant value.

The magnetic modulation magnet-optical recording apparatus of the present invention is not limited to a specific magnet-optical recording medium, and various media such as a magnet-optical disc, a magnet-optical tape, a magnet-optical card, and the like may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic field modulation magnet-optical recording apparatus having magnetic head means for applying to a magnet-optical recording medium a magnetic field modulated according to information to be recorded, and which forms a magnet-optical recording mark having the direction of magnetization specified in binary on said magnet-optical recording medium comprising:

AM modulation means for AM modulating a first recording signal having a first frequency based on a second recording signal having a second frequency lower than said first frequency, and then providing an AM modulation signal, magnetic head driving means for converting the current value of said provided AM modulation signal into a current value appropriate for generation of said magnetic field by said magnetic head means, and providing a magnetic head driving current of said appropriate current value to said magnetic head means, wherein the mark length of said magnet-optical recording mark is FM modulated based on at least said second recording signal.

2. The recording apparatus according to claim 1, wherein said AM modulation means comprises a positive direction current source, a negative direction current source, and a multiplier.

3. The recording apparatus according to claim 2, wherein said second recording signal is supplied to said multiplier.

4. The recording apparatus according to claim 3, wherein said AM modulation means comprises switching means which switches at a level of said second recording signal.

5. The recording apparatus according to claim 1, wherein said first recording signal comprises a modulated FM video signal, and said second recording signal comprises an audio signal.

6. The recording apparatus according to claim 1, wherein said first recording signal comprises a modulated digital signal, and said second recording signal comprises an information signal.

7. A magnetic field modulation magnet-optical recording apparatus having magnetic head means for applying a magnetic field modulated according to information to be recorded to a magnet-optical recording medium, and which forms on said magnet-optical recording medium a magnet-optical recording mark having the direction of magnetization specified in binary, comprising:

Am modulation means for AM modulating a first recording signal having a first frequency based on a second recording signal having a second frequency lower than said first frequency, and then providing an AM modulation signal, magnetic head driving means for converting the current value of said provided AM modulated signal into a current value appropriate for generation of said magnetic field by said magnetic head means, clip means for clipping as a clip level said provided signal with a predetermined negative direction current value in the output signal of said magnetic head driving means to provide the same to said magnetic head means, wherein the mark length of said magnet-optical recording mark is FM modulated based on at least said second recording signal.

8. The recording apparatus according to claim 7, wherein said AM modulation means comprises a positive direction current source, a negative direction current source, and a multiplier.

9. The recording apparatus according to claim 8, wherein said clip means comprises switching means which switches according to the level of said second recording signal, said switching means providing a constant current to said magnetic head driving means by said negative direction current source when said second recording signal is at a predetermined level.

10. A magnetic field modulation magnet-optical recording apparatus having magnetic head means for applying to a magnet-optical recording medium a magnetic field modulated according to information to be recorded, and which forms on said magnet-optical recording medium a magnet-optical recording mark having the direction of magnetization specified in binary, comprising:

adding means for adding a first recording signal having a first frequency and a second recording signal having a second frequency lower than said first frequency to provide an added signal, magnetic head driving means for converting the current value of said provided added signal into a current value appropriate for generation of said magnetic field by said magnetic head means to provide a magnetic head driving current of said appropriate current value to said magnetic head means, wherein the mark length of said magnetic recording mark is FM modulated based on at least said second frequency.

11. The recording apparatus according to claim 10, wherein said magnetic head driving means comprises a negative direction current limiter for clipping the negative direction current value of said magnetic head driving current.

12. A magnetic field modulation magnet-optical recording apparatus having a magnetic head for applying to a magnet-optical recording medium a magnetic field modulated according to information to be recorded, and which forms on said magnet-optical recording medium a magnet-optical recording mark having the direction of magnetization specified in binary, comprising:

a first current source for conducting a flow of positive direction current to said magnetic head means, a second current source for conducting a flow of negative direction current to said magnetic head means, switching means for alternately turning on/off said first current source and said second current source by a first recording signal having a first frequency, first current control means connected to said first current source for controlling the magnitude of the output current of said first current source based on the amplitude of a second recording signal having a second frequency lower than said first frequency to generate a magnetic head driving current for said magnetic head means to generate said magnetic field, wherein the mark length of said magnet-optical recording mark is FM modulated based on at least said second frequency.

13. The recording apparatus based on claim 12, further comprising second current control means connected to said second control source for controlling the magnitude of the output current of said second current source based on the amplitude of an inverted signal with respect to said second recording signal.

14. The recording apparatus according to claim 13, wherein said first and second current control means each comprise a multiplier.

* * * * *